July 1, 1941. A. E. CARLSON 2,247,650
LEMON SLICER
Filed Sept. 14, 1940
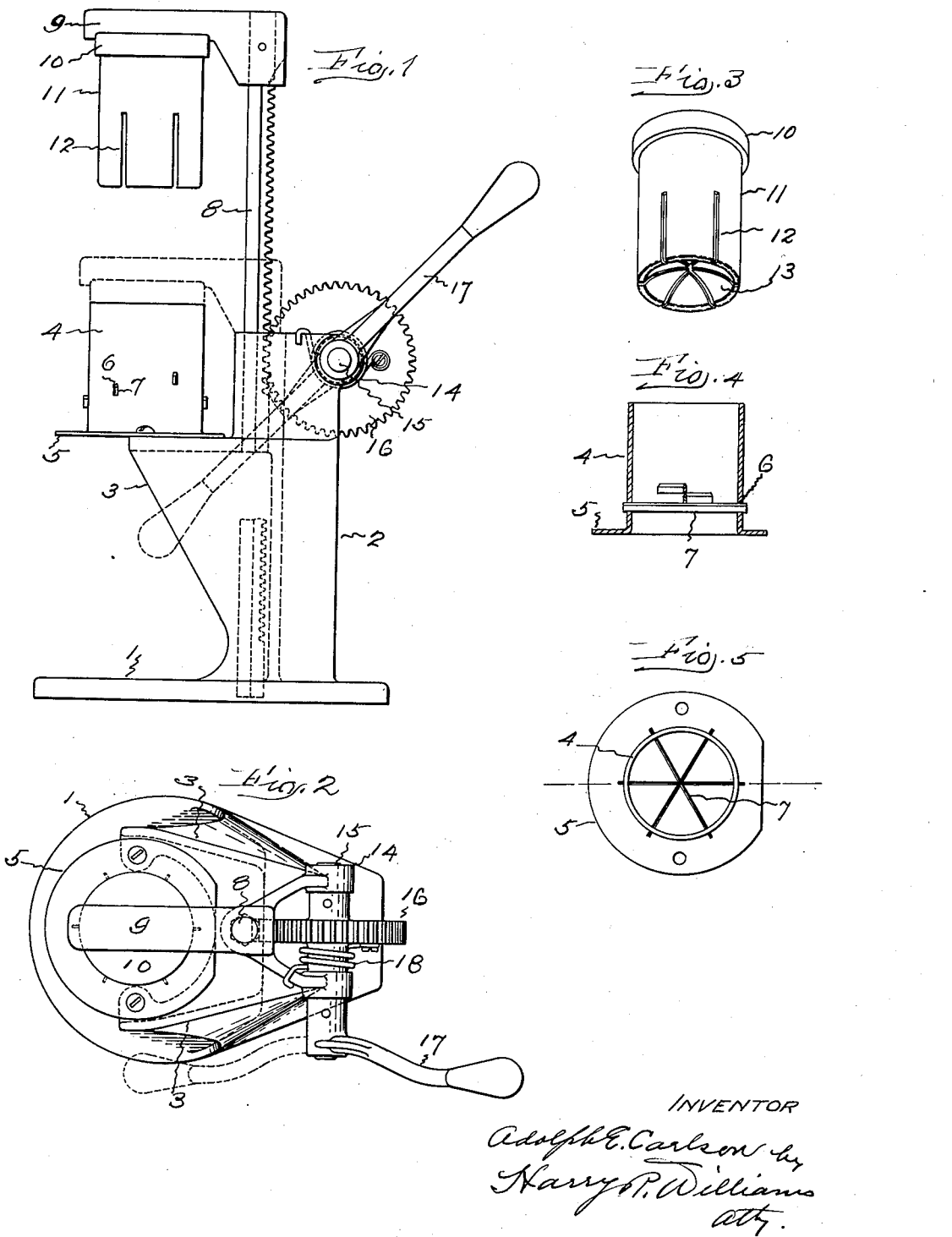
INVENTOR
Adolph E. Carlson by
Harry P. Williams
Atty.

Patented July 1, 1941

2,247,650

UNITED STATES PATENT OFFICE 2,247,650

LEMON SLICER

Adolph E. Carlson, Farmington, Conn., assignor of one-half to Donald H. Rapelye, Farmington, Conn.

Application September 14, 1940, Serial No. 356,769

5 Claims. (Cl. 146—169)

This invention relates to a machine for slicing lemons into longitudinal sections.

The object of the invention is to provide a relatively inexpensive machine into which lemons may be quickly placed and easily sliced by anyone, and which will deliver uniform fresh sections without torn or lacerated structure, as is desirable in club, restaurant and family kitchens for garnishing foods and serving with drinks.

The embodiment of the invention illustrated has a frame that supports a tubular casing provided in its interior with thin removably retained sharpened blades which are diametrically positioned in different angular relations one above the other. A tubular plunger with presser fingers in its interior near the lower end is attached to an arm secured to a vertical rack that is movably supported by the frame and is engaged by a gear on an arbor which has a handle that when turned forward and downward will cause the plunger fingers to force a lemon placed in the casing below the plunger down until it has completely passed the blades and is delivered in sections below.

Fig. 1 of the accompanying drawing is a side elevation of the machine, showing in full lines the handle, rack and plunger in their upper positions and indicating their lower positions by dotted lines.

Fig. 2 is a top view of the same.

Fig. 3 is a perspective view looking into the lower end of the plunger.

Fig. 4 is a central vertical section of the casing taken on dotted line 4—4 on Fig. 5.

Fig. 5 is a top view of the casing showing the angular relation of the blades.

This frame of the machine shown has a supporting base 1 and an upright standard 2 which has forwardly extending webs 3. The tubular casing 4 has an exterior flange 5 at its lower end which is mounted upon and secured to the webs. The casing shown has six slots 6 positioned diametrically opposite in pairs that are located at different levels and through these slots with their ends supported thereby are six thin sharp cutting blades 7. The blades can be removed for sharpening or replacing if broken, and being located 60° with relation to each other and one above the other they cut easily and smoothly as one blade acts in advance of the other, and furthermore the blades being held at their ends can be narrow and very thin and present practically no obstacle at the center which would tend to prevent a clean cutting of the core of the lemon when sliced.

Loosely supported and guided by the standard at the rear is a vertical rack bar 8. Fastened to the upper end of the rack bar is the rear end of a forwardly extending arm 9 and attached to the front end of this arm is a cap 10 which is secured to the upper end of the tubular plunger 11. The plunger is provided with six vertical downwardly opening slots 12 and the lower edges of plunger between the slots are bent inward and upward so as to form six concave pointed and more or less yielding fingers 13. The slots are so positioned that when the plunger is passed into the casing the slots will coincide with and receive the blades that extend across the interior of the casing and allow the lower edges of the plunger and the fingers to pass between and down below the blades.

Extending rearwardly from the top of the frame are a pair of lugs 14 and rotatably mounted in these lugs is an arbor 15 with a gear 16 that meshes with the rack. A handle 17 is provided for turning the arbor and gear and thus raising and lowering the rack and plunger. A spring 18 may be arranged on the arbor for lifting the handle when it is released.

In using the machine described it is preferred to first cut off a small portion of the tip at each end of the lemon and place the lemon in the casing above the blades. The handle then is turned forward and downward so as to rotate the arbor and the gear and cause the rack to move downward. This through the arm carries the plunger down and causes the fingers to force the lemon down against the blades until all of the lemon is pushed beyond the blades and the sections dropped into any receptacle that may be placed below. When the handle is released the spring causes the plunger to be lifted into position to allow the placing of another lemon in the casing. The fingers in the plunger being concaved center the lemon and being slightly resilient yield as they press the lemon down and then as the lemon passes the blades they tend to ensure the complete discharge of the lemon sections out of the casing.

The invention claimed is:

1. A slicing machine which comprises a frame, a tubular casing for receiving and surrounding the fruit to be cut supported by the frame, a plurality of thin sharp blades with cutting edges extending horizontally across the interior of the casing and with their ends retained by the casing, a tubular plunger with inwardly and upwardly extending concaved fingers in its lower end, a vertically movable rack, an arm connecting the rack with said plunger, a gear rotatably supported by the frame and meshing with the rack, and means for rotating the gear.

2. A slicing machine which comprises a frame, a tubular casing for receiving and surrounding the fruit to be sliced supported by the frame, a plurality of thin sharp blades extending horizontally across the interior of the casing at different angles and at different levels with their ends projecting through and retained by the casing, a tubular plunger with inwardly and upwardly extending concaved fingers in its lower end, a vertically movable rack, an arm connecting the rack with said plunger, a gear rotatably supported by the frame and meshing with the rack, and means for rotating the gear.

3. A slicing machine which comprises a frame, a tubular casing for receiving and surrounding the fruit to be sliced supported by the frame, said casing having pairs of opposite slots at different levels, a plurality of thin sharp blades extending horizontally across the interior of the casing with their ends removably retained in the slots of the casing, a vertically slotted tubular plunger with its lower edges between the slots turned inward and providing yielding presser fingers, a vertically movable rack, an arm connecting the rack with said plunger, a gear rotatably supported by the frame and meshing with the rack, and means for rotating the gear.

4. A slicing machine which comprises a frame, a vertically positioned cylindrical casing for receiving and surrounding the fruit to be sliced, supported by the frame and having diametrically opposite slots positioned at different levels near the bottom of said casing, a plurality of thin sharp blades with their cutting edges extending horizontally across the interior of the casing and their ends extending through and retained one above the other by said slots, said blades being individually insertable and removable radially of the casing, a slotted tubular plunger, a vertically movable rack, an arm connecting the upper end of the rack with the top of said plunger, a gear meshing with the rack and rotatably supported by the frame, and means for rotating the gear and thus reciprocating said plunger.

5. A slicing machine which comprises a frame, a cylindrical casing for receiving and surrounding the fruit to be sliced having slots through its side wall, supported vertically by the frame, a plurality of thin sharp blades with their cutting edges extending horizontally and diametrically across the interior near the lower end of the casing at different angles and resting one upon the other at the axis of said casing with the ends of said blades projecting through and retained by said slots in the casing wall, a tubular plunger, a vertically movable rack, an arm connecting the upper end of the rack with the top of said plunger, a gear meshing with the rack and rotatably supported by the frame, and means for rotating said gear.

ADOLPH E. CARLSON.